(12) United States Patent
Tiyyagura et al.

(10) Patent No.: US 11,016,972 B2
(45) Date of Patent: May 25, 2021

(54) SPLITTING A TIME-RANGE QUERY INTO MULTIPLE SUB-QUERIES FOR SERIAL EXECUTION

(71) Applicant: VMware, Inc., Palo Alto, CA (US)

(72) Inventors: Sundeep Tiyyagura, Fremont, CA (US); Mirza Mohsin Beg, Foster City, CA (US); A. Christer Sabelstrom, Monument, CO (US)

(73) Assignee: VMware, Inc., Palo Alto, CA (US)

( * ) Notice: Subject to any disclaimer, the term of this patent is extended or adjusted under 35 U.S.C. 154(b) by 376 days.

(21) Appl. No.: 15/881,382

(22) Filed: Jan. 26, 2018

(65) Prior Publication Data

US 2019/0236185 A1 Aug. 1, 2019

(51) Int. Cl.
*G06F 16/2453* (2019.01)
*G06F 16/248* (2019.01)
*G06F 16/242* (2019.01)
*G06F 16/2458* (2019.01)

(52) U.S. Cl.
CPC ...... *G06F 16/24535* (2019.01); *G06F 16/248* (2019.01); *G06F 16/2425* (2019.01); *G06F 16/2477* (2019.01)

(58) Field of Classification Search
CPC ........... G06F 16/24535; G06F 16/2425; G06F 16/2477
See application file for complete search history.

(56) References Cited

U.S. PATENT DOCUMENTS

| 5,060,150 | A | 10/1991 | Simor |
| 6,970,865 | B1 * | 11/2005 | Plasek ................. G06F 16/2246 |
| 7,215,970 | B2 | 5/2007 | Corrigan et al. |
| 7,444,679 | B2 | 10/2008 | Tarquini et al. |
| 7,953,571 | B2 | 5/2011 | Odaka et al. |
| 8,145,669 | B2 | 3/2012 | Cormode et al. |
| 8,291,490 | B1 | 10/2012 | Ahmed et al. |
| 8,375,060 | B2 | 2/2013 | Dewar et al. |
| 8,498,996 | B2 | 7/2013 | Whitcher et al. |
| 8,738,608 | B2 | 5/2014 | Pauly |

(Continued)

OTHER PUBLICATIONS

Final Office Action received for U.S. Appl. No. 15/908,690, dated Jun. 16, 2020, 19 pages.

(Continued)

*Primary Examiner* — Kris E Mackes
(74) *Attorney, Agent, or Firm* — Dentons US LLP

(57) ABSTRACT

Techniques for splitting a time-range query into sub-queries for serial execution are provided. In one embodiment, a user query is received requesting items within a time range from a database. The time range is divided into a plurality of time periods within the time range. Sub-queries defining respective time periods of the plurality of time periods are generated from the user query, and a first sub-query is executed. The first sub-query defines a first time period of the plurality of time periods, where the first time period is a most-recent time period or a least-recent time period among the plurality of time periods. If it is determined that a number of items obtained from executing the first sub-query is greater than or equal to a predetermined result target, then the items obtained from executing the first sub-query are provided and subsequent sub-queries are not executed.

20 Claims, 6 Drawing Sheets

(56) References Cited

U.S. PATENT DOCUMENTS

| | | | |
|---|---|---|---|
| 8,768,962 | B2 | 7/2014 | Laron |
| 8,949,224 | B2 | 2/2015 | Gupta |
| 9,047,558 | B2 | 6/2015 | Hochstein |
| 9,418,101 | B2 | 8/2016 | He et al. |
| 9,437,022 | B2 | 9/2016 | Vander Broek |
| 9,514,183 | B1 * | 12/2016 | Alla ............... G06F 16/245 |
| 9,582,500 | B2 | 2/2017 | Mcgillin et al. |
| 9,712,887 | B2 | 7/2017 | Myers et al. |
| 9,717,011 | B2 | 7/2017 | Huang et al. |
| 9,817,851 | B2 | 11/2017 | Dumant et al. |
| 9,892,237 | B2 | 2/2018 | Greenfield |
| 9,898,334 | B1 | 2/2018 | Dongare et al. |
| 10,044,578 | B2 | 8/2018 | He et al. |
| 10,073,903 | B1 | 9/2018 | Arye et al. |
| 10,242,061 | B2 | 3/2019 | Luo et al. |
| 10,445,334 | B1 | 10/2019 | Xiao et al. |
| 10,445,479 | B2 | 10/2019 | Rao et al. |
| 10,460,277 | B2 | 10/2019 | Dumant et al. |
| 10,496,653 | B1 | 12/2019 | Epshteyn et al. |
| 2002/0152254 | A1 | 10/2002 | Teng |
| 2004/0002956 | A1 | 1/2004 | Chaudhuri et al. |
| 2004/0215644 | A1 | 10/2004 | Edwards et al. |
| 2005/0114505 | A1 | 5/2005 | Destefano et al. |
| 2005/0120062 | A1 | 6/2005 | Sinha et al. |
| 2007/0061291 | A1 | 3/2007 | Azizi |
| 2007/0078827 | A1 | 4/2007 | Sareen et al. |
| 2008/0010268 | A1 * | 1/2008 | Liao ............... G06F 16/951 |
| 2011/0153953 | A1 | 6/2011 | Khemani et al. |
| 2012/0060165 | A1 | 3/2012 | Clarke |
| 2012/0207046 | A1 | 8/2012 | Di et al. |
| 2013/0227573 | A1 | 8/2013 | Morsi et al. |
| 2014/0068578 | A1 | 3/2014 | Gedik et al. |
| 2014/0109097 | A1 | 4/2014 | Datla et al. |
| 2014/0143505 | A1 | 5/2014 | Sim et al. |
| 2014/0172867 | A1 | 6/2014 | Lin et al. |
| 2015/0040121 | A1 | 2/2015 | Barabash et al. |
| 2015/0095097 | A1 | 4/2015 | Dejardine et al. |
| 2015/0186434 | A1 | 7/2015 | Eichinger et al. |
| 2015/0286661 | A1 | 10/2015 | Deluca et al. |
| 2016/0162543 | A1 | 6/2016 | Gustafson et al. |
| 2016/0179063 | A1 | 6/2016 | De et al. |
| 2016/0358084 | A1 | 12/2016 | Bloomquist et al. |
| 2017/0004006 | A1 | 1/2017 | Mori et al. |
| 2017/0068727 | A1 | 3/2017 | Rubin et al. |
| 2017/0177263 | A1 | 6/2017 | Das et al. |
| 2018/0103081 | A1 | 4/2018 | Fawcett |
| 2018/0137169 | A1 | 5/2018 | Zhao |
| 2018/0181632 | A1 | 6/2018 | Zarum et al. |
| 2018/0196824 | A1 | 7/2018 | Bitincka et al. |
| 2018/0270164 | A1 | 9/2018 | Ahmed et al. |
| 2018/0278500 | A1 | 9/2018 | Feamster et al. |
| 2018/0293275 | A1 | 10/2018 | P et al. |
| 2018/0329644 | A1 | 11/2018 | Das et al. |
| 2019/0073373 | A1 | 3/2019 | Surale et al. |
| 2019/0155850 | A1 | 5/2019 | Shi et al. |
| 2019/0226898 | A1 | 7/2019 | Gray, Jr. |
| 2019/0236182 | A1 | 8/2019 | Tiyyagura et al. |
| 2019/0236183 | A1 | 8/2019 | Tiyyagura et al. |
| 2019/0236197 | A1 | 8/2019 | Karlapudi et al. |
| 2019/0266273 | A1 | 8/2019 | Karlapudi et al. |
| 2019/0268227 | A1 | 8/2019 | Desai |
| 2019/0268401 | A1 | 8/2019 | Desai et al. |
| 2019/0286719 | A1 | 9/2019 | Morales et al. |
| 2020/0167361 | A1 | 5/2020 | Princehouse et al. |

OTHER PUBLICATIONS

Non-Final Office Action received for U.S. Appl. No. 15/881,364, dated Dec. 26, 2019, 15 pages.
Non-Final Office Action received for U.S. Appl. No. 15/881,376, dated Mar. 26, 2020, 13 pages.
Non-Final Office Action received for U.S. Appl. No. 15/881,396, dated Feb. 13, 2020, 13 pages.
Non-Final Office Action received for U.S. Appl. No. 15/908,480, dated Dec. 4, 2019, 13 pages.
Non-Final Office Action received for U.S. Appl. No. 15/908,690, dated Oct. 22, 2019, 15 pages.
Non-Final Office Action received for U.S. Appl. No. 15/908,693, dated Dec. 10, 2019, 25 pages.
Non-Final Office Action received for U.S. Appl. No. 15/925,464, dated Apr. 28, 2020, 9 pages.
Notice of Allowance received for U.S. Appl. No. 15/881,364, dated Aug. 4, 2020, 10 pages.
Notice of Allowance received for U.S. Appl. No. 15/908,480, dated Jul. 8, 2020, 10 pages.
Notice of Allowance received for U.S. Appl. No. 15/908,693, dated Jun. 12, 2020, 7 pages.
Final Office Action received for U.S. Appl. No. 15/881,376, dated Aug. 14, 2020, 12 pages.
Final Office Action received for U.S. Appl. No. 15/881,396, dated Sep. 15, 2020, 13 pages.
Notice of Allowance received for U.S. Appl. No. 15/925,464, dated Nov. 23, 2020, 10 pages.
U.S. Unpublished U.S. Appl. No. 17/074,048, filed Oct. 19, 2020, titled "Impartial Buffering in Stream Processing", Copy Not Attached.
U.S. Unpublished U.S. Appl. No. 17/087,492, filed Nov. 2, 2020, titled "Efficient Time-Range Queries on Databases in Distributed Computing Systems", Copy Not Attached.
U.S. Unpublished U.S. Appl. No. 17/113,478, filed Dec. 7, 2020, titled "Splitting a Query into Native Query Operations and Post-Processing Operations", Copy Not Attached.

* cited by examiner

SPLITTING A TIME-RANGE QUERY INTO MULTIPLE SUB-QUERIES FOR SERIAL EXECUTION

FIELD

The present disclosure relates generally to querying a database platform, and more specifically to splitting a time-range query into multiple sub-queries for serial execution.

BACKGROUND

Modern distributed information systems are increasingly complex and can include thousands of host computing devices, virtual machines (VMs) and networking components, servicing an even larger number of clients. Components of these systems produce massive volumes of machine-generated log data (application logs, network traces, configuration files, messages, performance data, system state dumps, etc.). Log data provides valuable information to system administrators as they manage these complex systems. Log data can be useful in troubleshooting, discovering trends, detecting security problems, and measuring performance. However, individual logs are difficult for a user to interpret and analyze efficiently.

In practice, unstructured and structured log data is aggregated or ingested from multiple sources, stored, and studied within an analytic framework to provide true operational value. Typically, software agents running on or within various system components aggregate log data as it is generated, and a database platform periodically ingests that data for later search and retrieval.

In order to retrieve specific log data from the database platform for analysis, the database platform is queried, and the results of the query are returned by the database platform. In some cases, a query that involves searching and/or retrieving a large amount of log data can be slow to fulfill due to the amount of data being processed. As the size and complexity of information systems continue to grow, the increasing volume of log data exacerbates the need for more customizable and efficient techniques for searching and retrieving log data for analysis.

OVERVIEW

Described herein are techniques for splitting a time-range query into sub-queries for serial execution. In one embodiment, a method includes: at a management plane of a distributed-computing system: receiving a user query requesting items stored by a database platform implemented on a data plane of the distributed-computing system, the user query specifying a time range; dividing the time range into a plurality of time periods within the time range; generating a plurality of sub-queries from the user query, each sub-query of the plurality of sub-queries defining a respective time period of the plurality of time periods; executing a first sub-query of the plurality of sub-queries to obtain items from the database platform, wherein the first sub-query defines a first time period of the plurality of time periods, and wherein the first time period is a most-recent time period or a least-recent time period among the plurality of time periods; in accordance with a determination that a number of items obtained from executing the first sub-query is greater than or equal to a predetermined result target: providing the items obtained from executing the first sub-query; and forgoing executing subsequent sub-queries of the plurality of sub-queries.

In some embodiments, the method further includes: in accordance with a determination that the number of items obtained from executing the first sub-query is not greater than or equal to a predetermined result target: executing one or more subsequent sub-queries of the plurality of sub-queries until a number of items greater than or equal to the predetermined result target are obtained; and providing the items obtained from executing the first sub-query and the one or more subsequent sub-queries. In some embodiments, a second sub-query in the one or more subsequent queries defines a second time period of the plurality of time periods, and wherein the second time period is a time period immediately prior to the most-recent time period or a time period immediately following the least-recent time period among the plurality of time periods. In some embodiments, the method further includes displaying a predetermined number of the items obtained from executing the first sub-query, wherein the predetermined number corresponds to the predetermined result target.

In some embodiments, the method further includes sorting the items obtained from executing the first sub-query into chronological or reverse chronological order based on a timestamp associated with each item; and displaying a predetermined number of the sorted items in chronological or reverse chronological order, wherein the predetermined number corresponds to the predetermined result target. In some embodiments, the method further includes sorting the items obtained from executing the first sub-query and the one or more subsequent sub-queries into chronological or reverse chronological order based on a timestamp associated with each item; and displaying a predetermined number of the sorted items in chronological or reverse chronological order, wherein the predetermined number corresponds to the predetermined result target.

In some embodiments, the predetermined result target corresponds to a predetermined maximum number of items for display on a page of results. In some embodiments, the method further includes receiving a request for a subsequent page of results; executing one or more subsequent sub-queries of the plurality of sub-queries until a number of items greater than or equal to the predetermined result target are obtained; and providing the items obtained from executing the one or more subsequent sub-queries.

In some embodiments, the method further includes storing an item timestamp corresponding to a most-recent or least-recent timestamped item obtained from executing the first sub-query, wherein the stored item timestamp defines a second time period for a second sub-query of the plurality of sub-queries. In some embodiments, the method further includes receiving a request to provide additional items corresponding to the user query; in response to receiving the request, executing the second sub-query of the plurality of sub-queries to obtain additional items from the database platform; and providing the additional items obtained from executing the second sub-query.

In some embodiments, the items stored by the database platform include log event records generated by an information processing system. In some embodiments, each item stored by the database platform corresponds to a record generated by an information processing system separate from the distributed-computing system, wherein each item is associated with a timestamp assigned by the information processing system.

In one embodiment, a distributed-computing system for splitting a time-range query into sub-queries for serial execution is provided. The distributed-computing system includes one or more processors and memory storing one or more programs configured to be executed by the one or more processors. The one or more programs include instructions for: at a management plane of a distributed-computing system: accessing a received user query requesting items stored by a database platform implemented on a data plane of the distributed-computing system, the user query specifying a time range; dividing the time range into a plurality of time periods within the time range; generating a plurality of sub-queries from the user query, each sub-query of the plurality of sub-queries defining a respective time period of the plurality of time periods; executing a first sub-query of the plurality of sub-queries to obtain items from the database platform, wherein the first sub-query defines a first time period of the plurality of time periods, and wherein the first time period is a most-recent time period or a least-recent time period among the plurality of time periods; in accordance with a determination that a number of items obtained from executing the first sub-query is greater than or equal to a predetermined result target: providing the items obtained from executing the first sub-query; and forgoing executing subsequent sub-queries of the plurality of sub-queries.

In one embodiment, a non-transitory computer-readable storage medium storing one or more programs configured to be executed by one or more processors is provided. The one or more programs include instructions for: at a management plane of a distributed-computing system: accessing a received user query requesting items stored by a database platform implemented on a data plane of the distributed-computing system, the user query specifying a time range; dividing the time range into a plurality of time periods within the time range; generating a plurality of sub-queries from the user query, each sub-query of the plurality of sub-queries defining a respective time period of the plurality of time periods; executing a first sub-query of the plurality of sub-queries to obtain items from the database platform, wherein the first sub-query defines a first time period of the plurality of time periods, and wherein the first time period is a most-recent time period or a least-recent time period among the plurality of time periods; in accordance with a determination that a number of items obtained from executing the first sub-query is greater than or equal to a predetermined result target: providing the items obtained from executing the first sub-query; and forgoing executing subsequent sub-queries of the plurality of sub-queries.

DETAILED DESCRIPTION

Figure 1A:
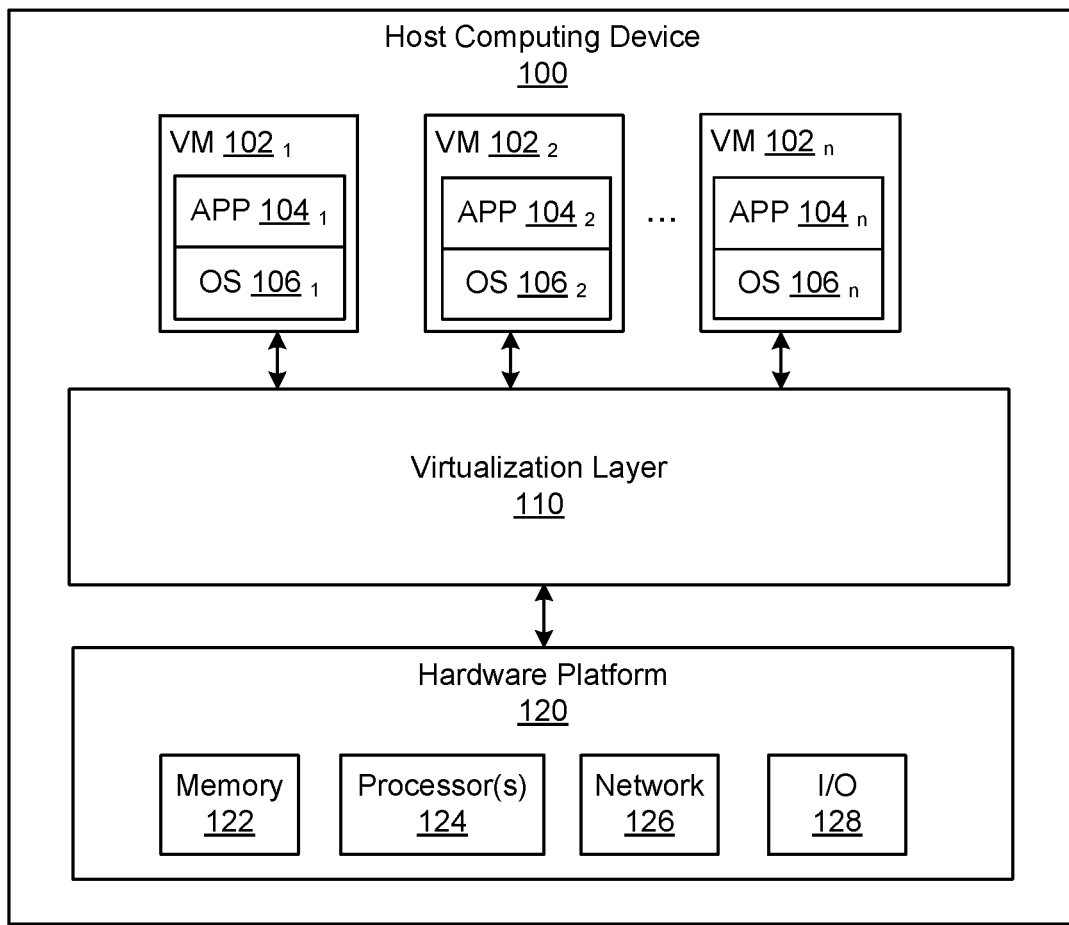
FIG. 1A is a block diagram illustrating a system and environment for implementing various components of a distributed-computing system, in accordance with some embodiments.

In the following description of embodiments, reference is made to the accompanying drawings in which are shown by way of illustration specific embodiments that can be practiced. It is to be understood that other embodiments can be used and structural changes can be made without departing from the scope of the various embodiments.

As described above, a database platform ingests and stores large amounts of log data generated by an information system for later search and retrieval. In some cases, a query that involves searching and/or retrieving a large amount of log data can be slow to fulfill due to the amount of data being processed. However, if the amount of log data being searched and/or retrieved is reduced, results for the query may be provided more quickly. In many cases, the amount of log data being stored fluctuates over time. For example, the information system may generate 200,000 log events in one 24 hour period, and 1 million log events in the next 24 hour period. Typically, in order to fulfill a query that involves searching and/or retrieving log data corresponding to the full 48 hour period, all 1,200,000 log events would be processed before the query results are provided. However, such a query may be fulfilled more quickly and efficiently if the query is split into multiple sub-queries, where each sub-query corresponds to a smaller time period. Thus, the present disclosure is directed to various techniques for splitting a time-range query into multiple sub-queries.

FIG. 1A is a block diagram illustrating a system and environment for implementing various components of a distributed-computing system, according to some embodiments. As shown, virtual machines (VMs) $102_1$, $102_2$ . . . $120_n$ are instantiated on host computing device 100. In some embodiments, host computing device 100 implements one or more elements of a distributed-computing system (e.g., distributed-computing system 200, described below with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

Figure 1B:
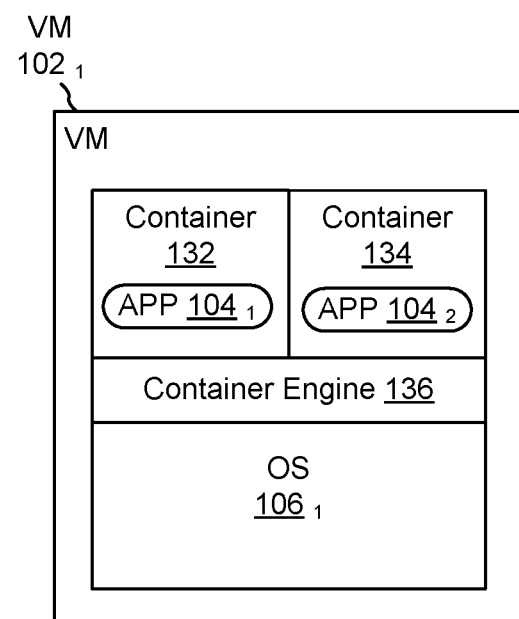
FIG. 1B is a block diagram illustrating a containerized application framework for implementing various components of a distributed-computing system, in accordance with some embodiments.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system).

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
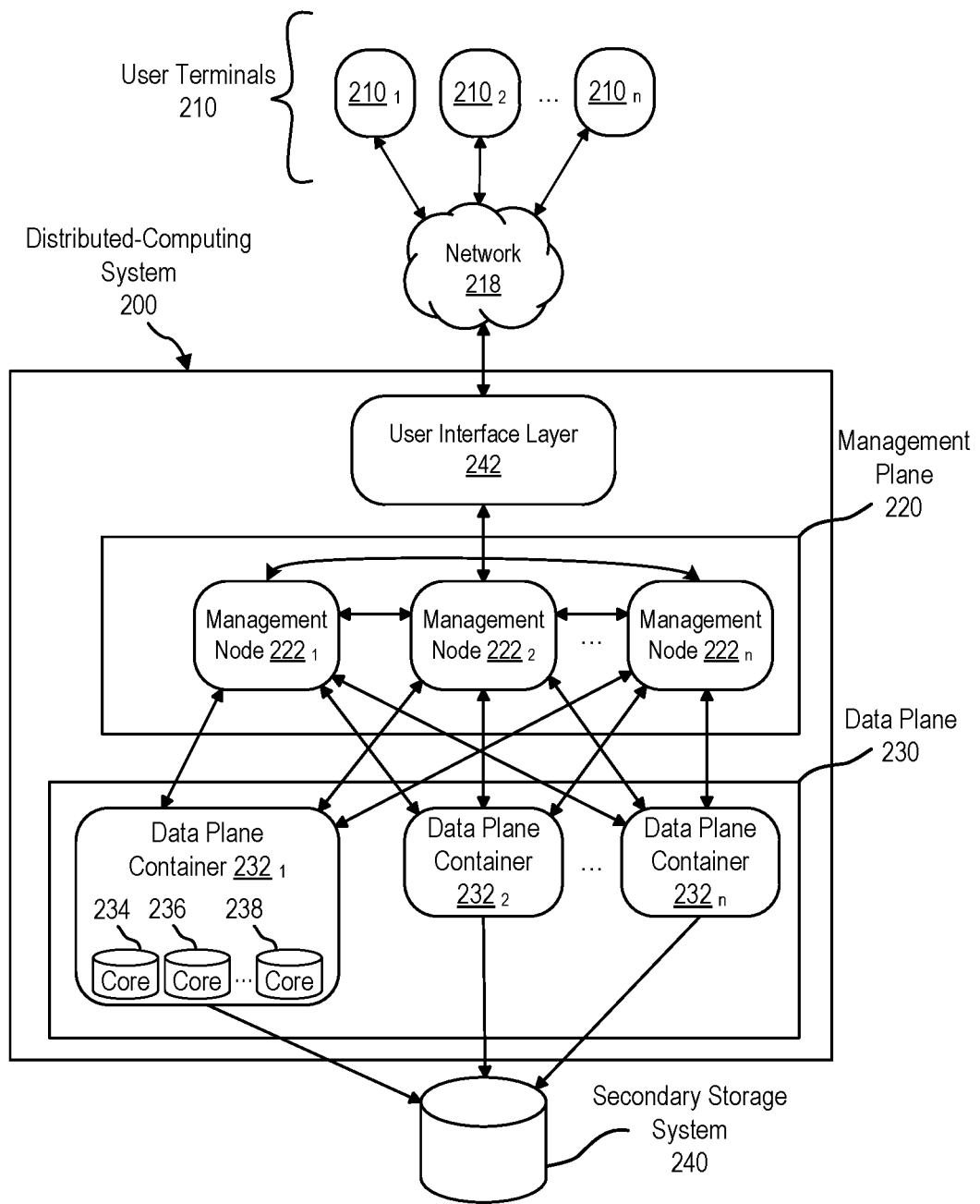
FIG. 2 illustrates systems and environment for searching and retrieving data stored in distributed-computing system, in accordance with some embodiments.

FIG. 2 illustrates systems and environment for searching and retrieving data stored in distributed-computing system 200, in accordance with some embodiments. As shown, user terminals 210 are coupled to distributed-computing system 200 through one or more communication networks 218. In particular, user terminals 210 communicate with user interface layer 242 of distributed-computing system 200 via communication networks 218. The user interface layer 242 is configured to provide user interface functionalities via user terminals 210. The functionalities include, for example, searching for items stored by distributed-computing system 200, displaying results of a query on a display, analyzing results of a query, etc. In some embodiments, the user interface layer 242 runs on a dedicated physical host, as an application within a virtual machine, within a software container on a dedicated host, within a software container on a virtual machine, or any combination thereof. The user interface layer 242 is coupled to management plane 220 of distributed-computing system 200. In some embodiments, user terminals 210 communicate with management plane 220 via user interface layer 242. In some embodiments, additional hardware and software components facilitate the transmission of data between user terminals 210 and management plane 220. For example, data can pass through a proxy server or load balancer before arriving at management nodes 222 within management plane 220.

Examples of communication network(s) 218 include local area networks (LAN) and wide area networks (WAN), e.g., the Internet. Communication network(s) 118 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. Further, it appreciated that, in some embodiments, physical communication networks, such as described above, are also be implemented as a software defined networks (SDN) or through software emulation.

Distributed-computing system 200 includes management plane 220 and data plane 230. The terms "management plane" and "data plane" refer to functional descriptions of elements of distributed-computing system 200 that perform specialized functions. Management plane 220 implements all business and management logic which allow an administrator to configure distributed-computing system 200, including data plane functionality. For example, management plane 220 is configured to perform management functions, such as process user queries, persist user configurations, and execute operational tasks on management nodes 222 and data plane containers 232. Management plane 220 is also configured to, for example, perform tasks related to input validation, user management, policy management, and background task tracking. In some embodiments, management plane 220 is also configured to, for example, perform packet switching, filtering, tagging, routing logic, and the like. In some embodiments, management plane 220 provides a single API entry point to distributed-computing system 200.

Management plane 220 includes one or more management nodes 222. Each management node 220 is an instantiation of management software (e.g. an application) which implements management functionality. Management node 222 runs on a dedicated physical host, as an application within a virtual machine, within a software container on a dedicated host, within a software container on a virtual machine, or any combination thereof. Each management node 222 is communicatively coupled to one another and to the data plane 230 via a communication interface(s) such as those described with respect to communications network 218. In some embodiments, each of the plurality of management nodes 222 independently implement management functionality for data plane 230. This redundancy improves reliability. For example, in situations where a management node (e.g. $222_1$) experiences a failure, another management node (e.g. $222_2$) can takeover to maintain management functionality.

Data plane 230 is coupled to management plane 220. Data plane 230 is configured to perform data processing functionality. In some embodiments, data plane 230 includes a database platform configured to ingest data received from management plane 220 and query stored data. The database platform is, for example, an Apache Solr™-based platform (developed by the Apache Software Foundation) that includes one or more Solr™ instances. The data plane 230 implements a database platform that provides database search functionality, such as text searching, hit highlighting, faceted searching, and indexing of items. A predetermined query language is used to carry out the search functionality provided by the database platform. The predetermined query language includes a limited set of predetermined native query operations that the database platform supports. This limited set of predetermined native query operations can be augmented with additional post-processing operations not supported by the database platform. The post-processing operations are executed separately from the database platform by management plane 220.

Data plane 230 includes a collection of data plane containers 232. Each data plane container is an instance of a software application implementing data processing functionality within a container (e.g., container 132). In some embodiments, data plane containers 232 run on a dedicated host or within a virtualized environment such as VM $102_1$ on host computing device 100. Each data plane container 232 is associated with one or more data cores (e.g. cores 234, 236, and 238). A data core is an allocation of storage resources for files associated with a single tenant or customer. In some embodiments, a core spans one or more storage medias such as hard disks, solid state drives, virtual storage area network devices (VSANs), or the like. In some embodiments, each data core includes a database index with configuration, such as schema, caching, and the like. For example, each data core includes a set of memory structures that manages database files for a database platform. In a specific example, each data core comprises a Solr™ core that includes a Lucene™ index.

Data plane 230 is further coupled to secondary storage system 240 via communication interface(s), such as those described with respect to communications network 218. Data plane containers 232 communicate with secondary storage system 240 and are configured to transfer data to and retrieve data from secondary storage system 240. Secondary storage system 240 is configured to provide additional data storage functions such as backing up data located on data plane containers 232 or serving as long-term storage for infrequently accessed data. In some embodiments, secondary storage system 240 includes one or more storage media such as hard disks, solid state drives, virtual storage area network devices (VSANs), or the like.

User terminals 210 provide access to distributed-computing system 200. In some embodiments, user terminals 210 send queries to distributed-computing system 200 and receive data (e.g., log data) from distributed-computing system 200 as specified by the queries. For example, in operation, a user (e.g., administrator) accesses, via user terminals 210, user interfaces provided by user interface layer 242 and enters a user query. The user query includes one or more criteria, such as a time range and a text string. Management plane 220 receives the user query from the user interface layer 242 and processes the user query. In particular, management plane 220 generates, from the user query, multiple sub-queries. Each of the sub-queries define a time period to be searched that is smaller than the original time range of the user query. The management plane 220 then executes each of the sub-queries to retrieve results from the database platform. In some embodiments, the sub-queries are executed in parallel. In some embodiments, the management plane 220 performs the parallel execution with multi-threading, where each thread is associated with a sub-query. In some embodiments, the management plane 220 performs the parallel execution with multiple processing resources, where each processing resource is associated with a sub-query.

After one or more of the sub-queries have been fulfilled, results are provided to the user terminals 210 via the user interface layer 242, and displayed by the user terminals 210. In some embodiments, the management plane 220 merges the results for each of the sub-queries before providing a final query result to the user terminals 210. In some embodiments, the management plane 220 provides results to the user terminals 210 once one or more of the sub-queries have retrieved a predetermined number of results.

Although in the present embodiment, distributed-computing system 200 includes management plane 220 and data plane 230, it should be recognized that, in other embodiments, distributed-computing system 200 can include additional functional layers. For example, distributed-computing system 200 can include additional software layers (e.g., applications) that facilitate functions related to providing alerts or notifications. In some embodiments, distributed-computing systems 200 includes additional intermediate software layers for handling ingestion request or user queries.

Figure 3:
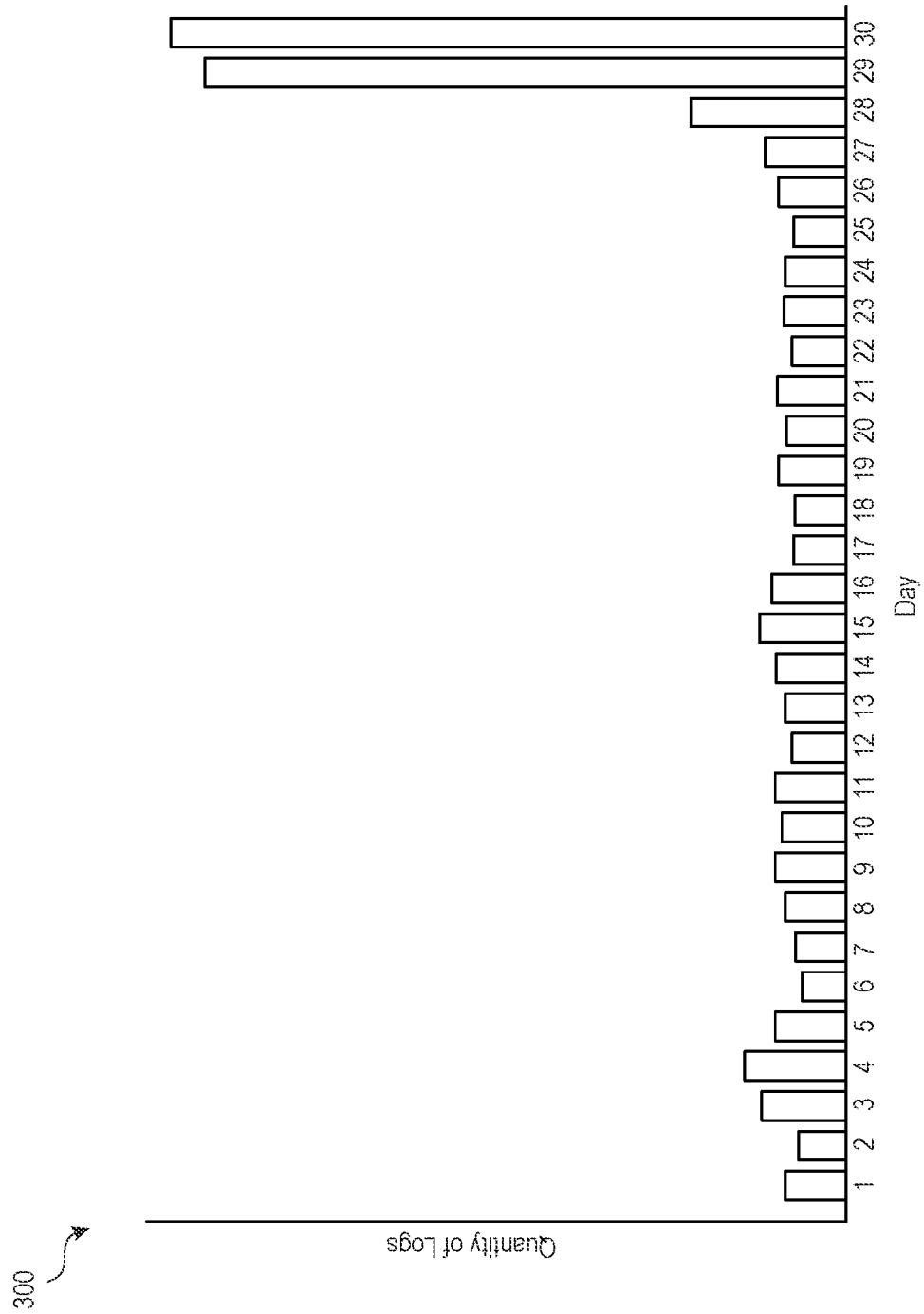
FIG. 3 illustrates an exemplary plot of the quantity of logs received over time from an information processing system, in accordance with some embodiments.

FIG. 3 illustrates an exemplary plot 300 of the quantity of logs received over time from an information processing system (e.g., one or more servers), in accordance with some embodiments. The logs that are received from the information processing system are stored in a database platform implemented by a distributed-computing system, such as distributed-computing system 200 described in reference to FIG. 2. As shown in FIG. 3, the quantity of logs fluctuates over time. For example, substantially more logs were generated on days 29 and 30 than days 1-28.

When the distributed-computing system receives a user query requesting logs within a time range (e.g., 30 days), the user query is split into multiple sub-queries defining shorter time periods. How the user query is to be split is based in part on the distribution of the requested logs over time. First, the total number of logs stored by the database platform that are within the full time range of the user query (e.g., 30 days) is determined. For example, the total number of logs in the 30-day time range shown in FIG. 3 may be 300 million. Depending on the total number of logs being searched, the number of sub-queries to be generated varies. In some embodiments, the number of sub-queries to be generated is based on a predetermined division value. The predetermined division value is a number that limits the number of logs each sub-query will preferably search. In order to determine the number of sub-queries to be generated, the total number of logs in the user query time range (e.g., 30 days) is divided by the predetermined division value. For example, if the predetermined division value is 100 million, then the 300 million logs in the 30-day time range would preferably be searched with 3 sub-queries.

After the number of sub-queries is determined, target values for each sub-query are determined. The target values represent a target number of logs that each sub-query will search. In some embodiments, each sub-query has the same target value. For example, if 3 sub-queries are being generated, and the total number of logs being searched is 300 million, then the target value for each sub-query is 100 million. In some embodiments, different target values are assigned to the sub-queries. When a sub-query is assigned a lower target value, then the sub-query will search fewer logs and may be able to provide results more quickly than other sub-queries with higher target values. In some embodiments, the target values are associated with predefined percentages of the total number of logs being searched. The predetermined percentages are also linked to the number of sub-queries to be generated. For example, if 3 sub-queries are to be generated, then 3 predetermined percentage values of 10%, 30%, and 60% are used to determine the target values. Continuing the above example where there are 300 million total logs being searched, the resulting 3 target values associated with the predetermined percentages are 30 million, 90 million, and 180 million.

Once the target values are determined, time periods containing a number of logs approximately equal to each target value are determined. For example, for a first target value of 30 million, the distributed-computing system determines how many days, starting from day 1, the system took to receive approximately 30 million logs (e.g., 13 days). For a second target value of 90 million, the distributed-computing system determines how many days, starting from the end of the first time period (e.g., day 13), the system took to receive approximately 90 million logs (e.g., 15 days). For a third target value of 180 million, the distributed-computing system determines whether the system received approximately 180 million logs during the remaining days (e.g., days 29-30).

Once the shorter time periods within the full time range of the user query are determined, the sub-queries defining each of the shorter time periods are generated. Each of the sub-queries implement the original user query, except over a respective shorter time period. For example, if the original user query was for logs between days 1-30 that contain the term "error", then a first sub-query may be for logs between days 1-13 that contain the term "error", a second sub-query may be for logs between days 14-28 that contain the term "error", and a third sub-query may be for logs between days 29-30 that contain the term "error". In some embodiments, once results for the first sub-query have been located, the results are provided while the other sub-queries continue to be executed. By assigning fewer logs for the first sub-query to search (e.g., as opposed to distributing the logs evenly between the sub-queries), the results for the first-query may be available more quickly than the results for the other sub-queries. This advantageously reduces the time to first byte (TTFB).

Figure 4:
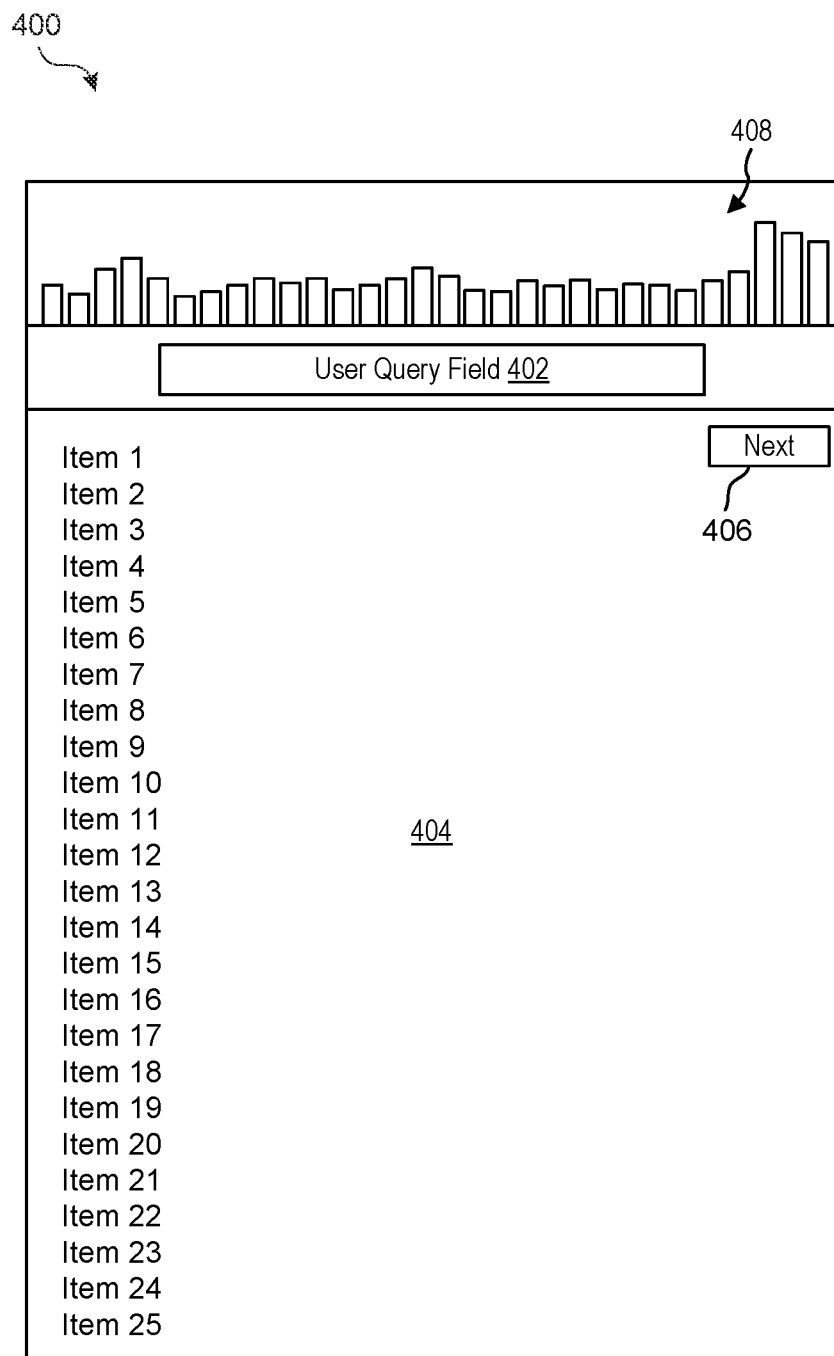
FIG. 4 illustrates an exemplary interface for viewing results of a query, in accordance with some embodiments.

FIG. 4 illustrates an exemplary interface 400 for viewing results of a query, in accordance with some embodiments. The interface 400 is provided by a distributed-computing system, such as distributed-computing system 200 described in reference to FIG. 2. More specifically, the interface 400 is provided by a user interface layer (e.g., user interface layer 242) of a distributed-computing system. The interface 400 includes a user query field 402 where a user query may be entered. A user query entered into the user query field 402 is provided to the distributed-computing system. The distributed-computing system accesses the received user query to perform a search of a database platform implemented by the distributed-computing system. After items corresponding to the user query are located, the distributed-computing system provides the items for display in a results field 404 of the interface 400. The number of items that can be displayed in the results field 404 is limited to a predetermined result target based on the size of the results field 404. If more items than can be displayed in the results field 404 are located, then another page of items can be displayed in the results field 404 in response to receiving a next page request. In some embodiments, the next page request is provided in response to an input on a next page icon 406.

In some embodiments, the interface 400 includes an item distribution 408. The item distribution 408 illustrates a quantity of items over time that correspond to a user query entered in the user query field 402.

When a user query specifying a time range is received by the distributed-computing system, the user query is divided into multiple sub-queries. Each sub-query defines a shorter time period within the time range specified by the user query. In some embodiments, the user query is divided into the multiple sub-queries as described in reference to FIG. 3.

In some embodiments, once the sub-queries have been generated, the distributed-computing system executes a first sub-query. The first sub-query defines either a most-recent time period within the specified time range or a least-recent time period within the specified time range. If the first sub-query locates a number of items that can fill the results field 404, then the located items are provided for display in the results field 404. In some embodiments, the number of items that can fill the results field 404 corresponds to a predetermined result target. In some embodiments, if the first sub-query fills the results field 404, then the other sub-queries are not executed until a next page request is received. Thus, in some embodiments, the sub-queries are executed serially in accordance with a user input (e.g., next page request) rather than in parallel.

In some cases, executing the sub-queries serially allows results to be provided more quickly. For example, sorting a large amount of items into chronological or reverse chronological order can be computationally intensive. However, each of the sub-queries return a smaller number of items than the full user query, so the results for one (or a sub-set) of the sub-queries can be sorted more efficiently since there are fewer items to process. Furthermore, when the sub-queries are executed serially, it is not necessary to wait for all the sub-queries to be fulfilled before providing results. This may reduce the time to first byte (TTFB). In addition, by waiting to execute subsequent sub-queries until a next page request is received, computing resources do not need to be unnecessarily expended executing sub-queries having results the user may not be interested in viewing.

If the first sub-query does not locate enough items to fill the results field 404, then subsequent sub-queries are executed until a number of items that can fill the results field 404 are located. The subsequent sub-queries are executed in order based on the respective time period each sub-query defines. For example, if the first sub-query defined a most-recent time period, then the next sub-query to be executed would define a time period immediately prior to the most-recent time period. The system stops executing subsequent sub-queries once enough items to fill the results field 404 are located. The located items are then provided for display in the results field 404.

In some embodiments, the items displayed in the results field 404 are sorted into chronological or reverse chronological order. The chronological (or reverse chronological) order is determined based on timestamps associated with each of the items.

In some embodiments, after the located items are displayed in the results field 404, a request for a next page of results is received. In order to locate items for the next page of results, subsequent sub-queries are executed until either enough items to fill the results field 404 of the next page are located, or all of the sub-queries have been executed. The located items are then provided for display in the next page of the results field 404.

In some embodiments, when located items are displayed in the results field 404, an item timestamp corresponding to the most-recent or least-recent item being displayed is stored. The stored item timestamp is used to identify a time period for a subsequent sub-query (e.g., the subsequent sub-query defines a time period immediately preceding or following the time of the stored item timestamp.) When a request to display a next page of results is received, the subsequent sub-query having the time period identified by the stored item timestamp is executed, and the located items are provided for display in the next page of the results field 404.

Figure 5:
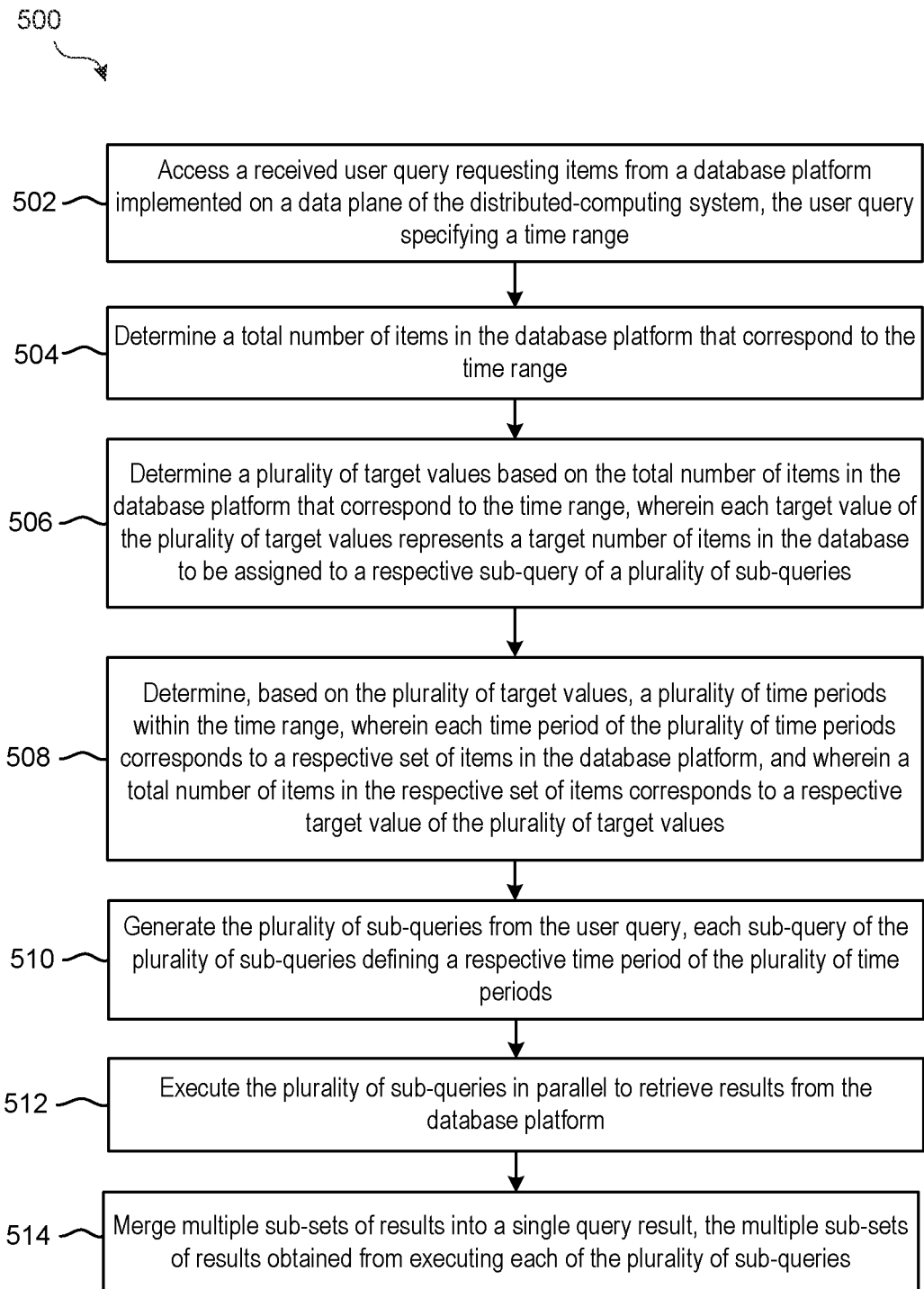
FIG. 5 illustrates a flowchart of exemplary process for splitting a time-range query into sub-queries for parallel execution, in accordance with some embodiments.

FIG. 5 illustrates a flowchart of exemplary process 500 for splitting a time-range query into sub-queries for parallel execution, in accordance with some embodiments. Process 500 is performed, for example, using a distributed-computing system (e.g., distributed-computing system 200 described in reference to FIG. 2). In some embodiments, the distributed-computing system comprises a plurality of host computing devices (e.g., host computing device 100 described in reference to FIG. 1A) that are communicatively coupled together in a network. In some embodiments, the distributed-computing system is implemented by one or more virtual machines (e.g., VM 102 described in reference to FIGS. 1A-1B). The distributed-computing system implements, for example, a management plane (e.g., management plane 220) and a data plane (e.g., data plane 230). In some embodiments, the operations of process 500 are distributed across the various components (e.g., management plane, data plane, etc.) of the distributed-computing system. In process 500, some blocks are, optionally, combined, the order of some blocks is, optionally, changed, and some blocks are, optionally, omitted. In some embodiments, additional operations may be performed in combination with process 500.

While process 500 is described in the context of a distributed-computing system implementing a database platform, it should be understood that process 500 can be performed by other systems implementing a database platform and/or search platform, such as one or more servers or local computers.

At block 502, a user query requesting items from a database platform implemented on a data plane of the distributed-computing system is accessed. The user query specifies at least a time range. In some embodiments, the items requested from the database platform include log event records generated by an information processing system external to the distributed-computing system.

At block 504, a total number of items in the database platform that correspond to the time range is determined.

At block 506, a plurality of target values based on the total number of items in the database platform that correspond to the time range are determined. Each target value of the plurality of target values represents a target number of items in the database platform to be assigned to a respective sub-query of a plurality of sub-queries. In some embodiments, each target value of the plurality of target values is associated with a predetermined percentage of the total number of items in the database that correspond to the time range. In some embodiments, determining the plurality of target values includes determining a quantity of target values for the plurality of target values based on one or more predetermined conditions, wherein the quantity of target values correspond to a quantity of sub-queries in the plurality of sub-queries. In some embodiments, the one or more predetermined conditions include a condition that no target value in the plurality of target values exceeds a predetermined item threshold. In some embodiments, the one or more predetermined conditions include a condition that an estimated time to execute a first sub-query of the plurality of queries is less than a predetermined time threshold.

At block 508, based on the plurality of target values, a plurality of time periods within the time range are determined. Each time period of the plurality of time periods corresponds to a respective set of items in the database platform, and a total number of items in the respective set of items corresponds to a respective target value of the plurality of target values.

At block 510, the plurality of sub-queries are generated from the user query. Each sub-query of the plurality of sub-queries defines a respective time period of the plurality of time periods. In some embodiments, each of the plurality of sub-queries includes one or more predefined post-processing operations not executable by the database platform.

At block 512, the plurality of sub-queries are executed in parallel to retrieve results from the database platform. In some embodiments, a first sub-set of results obtained from executing a first sub-query of the plurality of sub-queries are provided while one or more other sub-queries of the plurality of sub-queries are executing. In some embodiments, the plurality of target values includes a first target value corresponding to the first sub-query, and the first target value is the smallest target value among the plurality of target values. In some embodiments, execution of the first sub-query is completed prior to any other sub-query of the plurality of sub-queries.

In some embodiments, at block 514, multiple sub-sets of results are merged into a single query result. The multiple sub-sets of results are obtained from executing each of the plurality of sub-queries. In some embodiments, the user query defines one or more criteria other than the time range, and executing each sub-query of the plurality of sub-queries includes filtering, according to the one or more criteria, the respective set of items corresponding to the respective time period defined by the respective sub-query.

Figure 6:
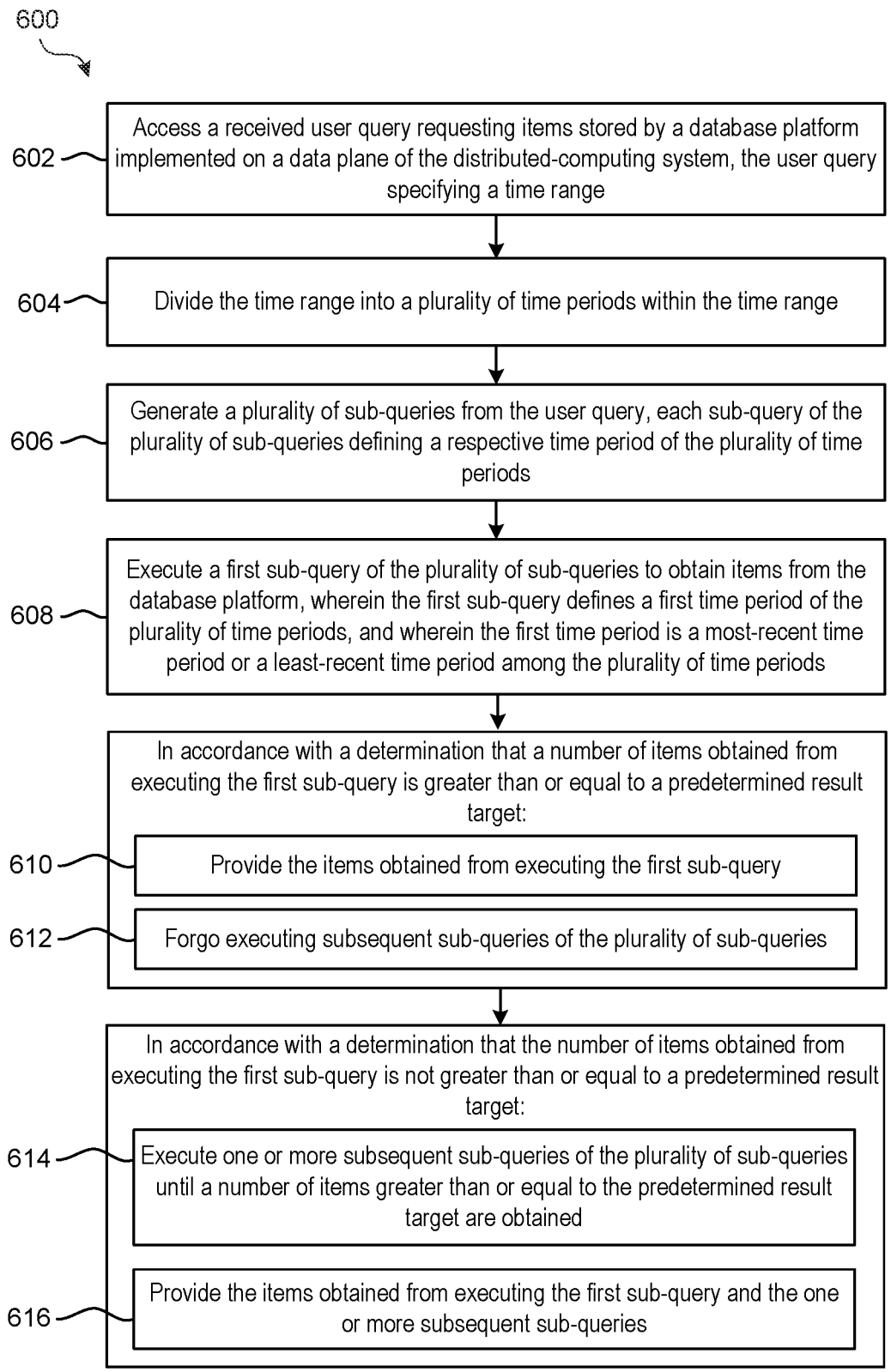
FIG. 6 illustrates a flowchart of exemplary process for splitting a time-range query into sub-queries for serial execution and presentation, in accordance with some embodiments.

FIG. 6 illustrates a flowchart of exemplary process 600 for splitting a time-range query into sub-queries for serial execution and presentation, in accordance with some embodiments. Process 600 is performed, for example, using a distributed-computing system (e.g., distributed-computing system 200 described in reference to FIG. 2). In some embodiments, the distributed-computing system comprises a plurality of host computing devices (e.g., host computing device 100 described in reference to FIG. 1A) that are communicatively coupled together in a network. In some embodiments, the distributed-computing system is implemented by one or more virtual machines (e.g., VM 102 described in reference to FIGS. 1A-1B). The distributed-computing system implements, for example, a management plane (e.g., management plane 220) and a data plane (e.g., data plane 230). In some embodiments, the operations of process 600 are distributed across the various components (e.g., management plane, data plane, etc.) of the distributed-computing system. In process 600, some blocks are, optionally, combined, the order of some blocks is, optionally, changed, and some blocks are, optionally, omitted. In some embodiments, additional operations may be performed in combination with process 600.

While process 600 is described in the context of a distributed-computing system implementing a database platform, it should be understood that process 600 can be performed by other systems implementing a database platform and/or search platform, such as one or more servers or local computers.

At block 602, a user query requesting items stored by a database platform implemented on a data plane of the distributed-computing system is accessed. The user query specifies at least a time range. In some embodiments, the items stored by the database platform include log event records generated by an information processing system. In some embodiments, each item stored by the database platform corresponds to a record generated by an information processing system separate from the distributed-computing system. Each item is associated with a timestamp assigned by the information processing system.

At block 604, the time range specified by the user query is divided into a plurality of time periods within the time range.

At block 606, a plurality of sub-queries are generated from the user query. Each sub-query of the plurality of sub-queries defines a respective time period of the plurality of time periods.

At block 608, a first sub-query of the plurality of sub-queries is executed to obtain items from the database platform. The first sub-query defines a first time period of the plurality of time periods, and the first time period is a most-recent time period or a least-recent time period among the plurality of time periods.

At block 610, in accordance with a determination that a number of items obtained from executing the first sub-query is greater than or equal to a predetermined result target, the items obtained from executing the first sub-query are provided, and, at block 612, execution of subsequent sub-queries of the plurality of sub-queries is forgone. In some embodiments, the predetermined result target corresponds to a predetermined maximum number of items for display on a page of results.

In some embodiments, a predetermined number of the items obtained from executing the first sub-query are displayed. In some embodiments, the items obtained from executing the first sub-query are sorted into chronological or reverse chronological order based on a timestamp associated with each item, and a predetermined number of the sorted items are displayed in chronological or reverse chronological order. The predetermined number corresponds to the predetermined result target.

In some embodiments, an item timestamp corresponding to a most-recent or least-recent timestamped item obtained from executing the first sub-query is stored. The stored item timestamp defines a second time period for a second sub-query of the plurality of sub-queries. In some embodiments, after the item timestamp is stored, a received request to provide additional items corresponding to the user query is accessed. In response to accessing the received request, the second sub-query of the plurality of sub-queries is executed to obtain additional items from the database platform, and the additional items obtained from executing the second sub-query are provided.

At block 614, in accordance with a determination that the number of items obtained from executing the first sub-query is not greater than or equal to a predetermined result target, one or more subsequent sub-queries of the plurality of sub-queries are executed until a number of items greater than or equal to the predetermined result target are obtained, and, at block 616, the items obtained from executing the first sub-query and the one or more subsequent sub-queries are provided. In some embodiments, a second sub-query in the one or more subsequent queries defines a second time period of the plurality of time periods, and the second time period is a time period immediately prior to the most-recent time period or a time period immediately following the least-recent time period among the plurality of time periods.

In some embodiments, the items obtained from executing the first sub-query and the one or more subsequent sub-queries are sorted into chronological or reverse chronological order based on a timestamp associated with each item, and a predetermined number of the sorted items are displayed in chronological or reverse chronological order. The predetermined number corresponds to the predetermined result target.

In some embodiments, a request for a subsequent page of results is received, then one or more subsequent sub-queries of the plurality of sub-queries are executed until a number of items greater than or equal to the predetermined result target are obtained, and the items obtained from executing the one or more subsequent sub-queries are provided.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for splitting a time-range query into sub-queries for serial execution, the method comprising:
  at a management plane of a distributed-computing system:
    receiving a user query requesting items stored by a database platform implemented on a data plane of the distributed-computing system, the user query specifying a time range;
    dividing the time range into a plurality of time periods within the time range, wherein each time period of the plurality of time periods corresponds to a respective number of items in the database platform, and wherein the plurality of time periods include:
      a first time period corresponding to a first number of items,
      a second time period corresponding to a second number of items larger than the first number of items, and
      a third time period corresponding to a third number of items larger than the first and second numbers of items;
    generating a plurality of sub-queries from the user query, each sub-query of the plurality of sub-queries defining a respective time period of the plurality of time periods;
    executing a first sub-query of the plurality of sub-queries to obtain items from the database platform, wherein the first sub-query defines the first time period of the plurality of time periods, wherein the first time period corresponds to a smaller number of items than the respective numbers of items corresponding to other time periods in the plurality of time periods, and wherein the first time period is a most-recent time period or a least-recent time period among the plurality of time periods;
in accordance with a determination that a number of items obtained from executing the first sub-query is greater than or equal to a predetermined result target:
providing the items obtained from executing the first sub-query; and
forgoing executing subsequent sub-queries of the plurality of sub-queries.

2. The method of claim 1, further comprising:
in accordance with a determination that the number of items obtained from executing the first sub-query is not greater than or equal to a predetermined result target:
executing one or more subsequent sub-queries of the plurality of sub-queries until a number of items greater than or equal to the predetermined result target are obtained; and
providing the items obtained from executing the first sub-query and the one or more subsequent sub-queries.

3. The method of claim 2, wherein a second sub-query in the one or more subsequent queries defines the second time period of the plurality of time periods, and wherein the second time period is a time period immediately prior to the most-recent time period or a time period immediately following the least-recent time period among the plurality of time periods.

4. The method of claim 1, further comprising:
displaying a predetermined number of the items obtained from executing the first sub-query, wherein the predetermined number corresponds to the predetermined result target.

5. The method of claim 1, further comprising:
sorting the items obtained from executing the first sub-query into chronological or reverse chronological order based on a timestamp associated with each item; and
displaying a predetermined number of the sorted items in chronological or reverse chronological order, wherein the predetermined number corresponds to the predetermined result target.

6. The method of claim 2, further comprising:
sorting the items obtained from executing the first sub-query and the one or more subsequent sub-queries into chronological or reverse chronological order based on a timestamp associated with each item; and
displaying a predetermined number of the sorted items in chronological or reverse chronological order, wherein the predetermined number corresponds to the predetermined result target.

7. The method of claim 1, wherein the predetermined result target corresponds to a predetermined maximum number of items for display on a page of results.

8. The method of claim 7, further comprising:
receiving a request for a subsequent page of results;
executing one or more subsequent sub-queries of the plurality of sub-queries until a number of items greater than or equal to the predetermined result target are obtained; and
providing the items obtained from executing the one or more subsequent sub-queries.

9. The method of claim 1, further comprising:
storing an item timestamp corresponding to a most-recent or least-recent timestamped item obtained from executing the first sub-query, wherein the stored item timestamp defines a second time period for a second sub-query of the plurality of sub-queries.

10. The method of claim 9, further comprising:
receiving a request to provide additional items corresponding to the user query;
in response to receiving the request, executing the second sub-query of the plurality of sub-queries to obtain additional items from the database platform; and
providing the additional items obtained from executing the second sub-query.

11. The method of claim 1, wherein the items stored by the database platform include log event records generated by an information processing system.

12. The method of claim 1, wherein each item stored by the database platform corresponds to a record generated by an information processing system separate from the distributed-computing system, wherein each item is associated with a timestamp assigned by the information processing system.

13. A distributed-computing system for splitting a time-range query into sub-queries for serial execution, comprising
one or more processors; and
memory storing one or more programs configured to be executed by the one or more processors, the one or more programs including instructions for:
at a management plane of a distributed-computing system:
accessing a received user query requesting items stored by a database platform implemented on a data plane of the distributed-computing system, the user query specifying a time range;
dividing the time range into a plurality of time periods within the time range, wherein each time period of the plurality of time periods corresponds to a respective number of items in the database platform, and wherein the plurality of time periods include:
a first time period corresponding to a first number of items,
a second time period corresponding to a second number of items larger than the first number of items, and
a third time period corresponding to a third number of items larger than the first and second numbers of items;
generating a plurality of sub-queries from the user query, each sub-query of the plurality of sub-queries defining a respective time period of the plurality of time periods;
executing a first sub-query of the plurality of sub-queries to obtain items from the database platform, wherein the first sub-query defines the first time period of the plurality of time periods, wherein the first time period corresponds to a smaller number of items than the respective numbers of items corresponding to other time periods in the plurality of time periods, and wherein the first time period is a most-recent time period or a least-recent time period among the plurality of time periods;
in accordance with a determination that a number of items obtained from executing the first sub-query is greater than or equal to a predetermined result target:
providing the items obtained from executing the first sub-query; and
forgoing executing subsequent sub-queries of the plurality of sub-queries.

14. The distributed-computing system of claim 13, wherein the one or more programs further include instructions for:

in accordance with a determination that the number of items obtained from executing the first sub-query is not greater than or equal to a predetermined result target:
  executing one or more subsequent sub-queries of the plurality of sub-queries until a number of items greater than or equal to the predetermined result target are obtained; and
  providing the items obtained from executing the first sub-query and the one or more subsequent sub-queries.

15. The distributed-computing system of claim 13, wherein the one or more programs further include instructions for:
  displaying a predetermined number of the items obtained from executing the first sub-query, wherein the predetermined number corresponds to the predetermined result target.

16. The distributed-computing system of claim 13, wherein the one or more programs further include instructions for:
  sorting the items obtained from executing the first sub-query into chronological or reverse chronological order based on a timestamp associated with each item; and
  displaying a predetermined number of the sorted items in chronological or reverse chronological order, wherein the predetermined number corresponds to the predetermined result target.

17. A non-transitory computer-readable storage medium storing one or more programs configured to be executed by one or more processors, the one or more programs including instructions for:
  at a management plane of a distributed-computing system:
    accessing a received user query requesting items stored by a database platform implemented on a data plane of the distributed-computing system, the user query specifying a time range;
    dividing the time range into a plurality of time periods within the time range, wherein each time period of the plurality of time periods corresponds to a respective number of items in the database platform, and wherein the plurality of time periods include:
      a first time period corresponding to a first number of items,
      a second time period corresponding to a second number of items larger than the first number of items, and
      a third time period corresponding to a third number of items larger than the first and second numbers of items;
    generating a plurality of sub-queries from the user query, each sub-query of the plurality of sub-queries defining a respective time period of the plurality of time periods;
    executing a first sub-query of the plurality of sub-queries to obtain items from the database platform, wherein the first sub-query defines the first time period of the plurality of time periods, wherein the first time period corresponds to a smaller number of items than the respective numbers of items corresponding to other time periods in the plurality of time periods, and wherein the first time period is a most-recent time period or a least-recent time period among the plurality of time periods;
    in accordance with a determination that a number of items obtained from executing the first sub-query is greater than or equal to a predetermined result target:
      providing the items obtained from executing the first sub-query; and
      forgoing executing subsequent sub-queries of the plurality of sub-queries.

18. The non-transitory computer-readable storage medium of claim 17, wherein the one or more programs further include instructions for:
  in accordance with a determination that the number of items obtained from executing the first sub-query is not greater than or equal to a predetermined result target:
    executing one or more subsequent sub-queries of the plurality of sub-queries until a number of items greater than or equal to the predetermined result target are obtained; and
    providing the items obtained from executing the first sub-query and the one or more subsequent sub-queries.

19. The non-transitory computer-readable storage medium of claim 17, wherein the one or more programs further include instructions for:
  displaying a predetermined number of the items obtained from executing the first sub-query, wherein the predetermined number corresponds to the predetermined result target.

20. The non-transitory computer-readable storage medium of claim 17, wherein the one or more programs further include instructions for:
  sorting the items obtained from executing the first sub-query into chronological or reverse chronological order based on a timestamp associated with each item; and
  displaying a predetermined number of the sorted items in chronological or reverse chronological order, wherein the predetermined number corresponds to the predetermined result target.

* * * * *